United States Patent [19]
Han

[11] Patent Number: 6,085,387
[45] Date of Patent: Jul. 11, 2000

[54] HINGE DEVICE

[75] Inventor: Young Soo Han, Kyungki-Do, Rep. of Korea

[73] Assignee: Phoenix Korea Co., Ltd., Kyungki-Do, Rep. of Korea

[21] Appl. No.: 09/149,983

[22] Filed: Sep. 9, 1998

[30] Foreign Application Priority Data

May 18, 1998 [KR] Rep. of Korea .................. 98-17775

[51] Int. Cl.⁷ .............................. E05D 11/10; E05F 1/08
[52] U.S. Cl. ................................ 16/330; 16/303
[58] Field of Search ................. 16/330, 303, 304, 16/329, 331

[56] References Cited

U.S. PATENT DOCUMENTS

| | | |
|---|---|---|
| 4,897,873 | 1/1990 | Beutler et al. . |
| 5,185,790 | 2/1993 | Mischneko . |
| 5,259,019 | 11/1993 | Stilley . |
| 5,628,089 | 5/1997 | Wilcox et al. ............... 16/303 |
| 5,651,063 | 7/1997 | Ji et al. . |
| 5,661,797 | 8/1997 | Leman et al. . |
| 5,761,300 | 6/1998 | Domoleczny . |
| 5,799,079 | 8/1998 | Inoue . |

FOREIGN PATENT DOCUMENTS

| | | |
|---|---|---|
| 8-65369 | 3/1996 | Japan . |
| 94-25244 | 11/1994 | Rep. of Korea . |
| 94-27373 | 12/1994 | Rep. of Korea . |
| 94-27375 | 12/1994 | Rep. of Korea . |
| 95-3838 | 5/1995 | Rep. of Korea . |
| 95-16135 | 6/1995 | Rep. of Korea . |
| 95-28895 | 10/1995 | Rep. of Korea . |
| 96-3356 | 1/1996 | Rep. of Korea . |
| 96-6945 | 5/1996 | Rep. of Korea . |
| 96-20217 | 6/1996 | Rep. of Korea . |
| 96-34654 | 10/1996 | Rep. of Korea . |
| 96-9192 | 10/1996 | Rep. of Korea . |
| 96-35780 | 11/1996 | Rep. of Korea . |
| 97-3514 | 1/1997 | Rep. of Korea . |
| 97-9071 | 2/1997 | Rep. of Korea . |
| 97-15497 | 4/1997 | Rep. of Korea . |
| 97-19181 | 4/1997 | Rep. of Korea . |
| 97-47849 | 7/1997 | Rep. of Korea . |
| 122503 | 11/1997 | Rep. of Korea . |
| 97-64422 | 12/1997 | Rep. of Korea . |
| WO 92/17973 | 3/1992 | WIPO . |
| WO 92/17974 | 3/1992 | WIPO . |
| WO 90/05421 | 10/1998 | WIPO . |

*Primary Examiner*—Chuck Y. Mah
*Attorney, Agent, or Firm*—Knobbe, Martens, Olson & Bear, LLP

[57] ABSTRACT

A hinge for coupling a body and a button cover of a radiotelephone has a can, a first member, a second member and a spring. The can has an partially closed end and an open end. A retaining protrusions are provided to close the open end by way of bending. The first member has a shaft protruding through the partially closed end of the can and two protrusions defining a cam follower. The second member has a cam portion interacting with the cam follower. The cam portion includes at least a peak and two valleys separated by the peak and slopes connecting the peak and the valleys. The spring pushes the second member toward the first member. The first member, the second member and the spring are contained within the can in turn. Then, the protrusions are bended.

25 Claims, 7 Drawing Sheets

HINGE DEVICE

FIELD OF THE INVENTION

The present invention relates generally to the field of a portable radiotelephone, and more particularly to a hinge device of coupling a button cover and a body of the radiotelephone.

BACKGROUND OF THE INVENTION

A plurality of buttons is equipped on the top surface of a portable radiotelephone. A button cover covering the buttons is prepared to prevent the buttons of the radiotelephone from being accidentally operated by the unintentional exertion of force. The button cover may rotate between a first position covering the buttons and a second position allowing a user to push one of the buttons, which is known in the art.

The button cover structure of the portable radiotelephone should be designed for a user to use conveniently. For this, a hinge device is provided to make the button cover move automatically toward either the first or second position.

Manufacturers have tried to reduce the volume, size and weight of the portable radiotelephone. The more the radiotelephone is miniaturized, the more it needs to be easily manufactured. Thus, it is desirable that the hinge coupling a body of the radiotelephone with the button cover is modulated and miniaturized. The modulated hinge device is required to have the structure for holding moving parts of the hinge, such as a cam member, a cam follower and a spring. For miniaturization, the size and the number of parts of the holding structure should be reduced.

The relative motion between the cam member and the cam follower of the hinge is required to be smoothly done. Additionally, when the cam follower slides along the cam surface, it should be guided stably.

SUMMARY OF THE INVENTION

Accordingly, it is an object of the present invention to provide a hinge device having a reduced size.

It is another object of the present invention to provide a hinge device allowing the smooth and accurate relative motion between a cam portion and a cam follower.

The above and other objects of the present invention are accomplished by providing a hinge comprising:

a can having a partially closed end, an opened end and a protrusion which can be bended so as to at least partially close the opened end;

a first member contained within the can and having an end protruding through the partially closed end of the can;

a second member contained within the can;

one of the first member and the second member having a cam portion, the cam portion including at least a peak and two valleys separated by the peak and slopes connecting the peak and the valleys;

the other of the first member and the second member having a cam follower interacting with said cam portion; and an elastic member contained within the can and pushing the second member toward the first member.

In accordance with another aspect of the invention, there is provided a hinge comprising:

a can having a partially closed end and an opened end;

a first member contained within the can and having an end protruding through the partially closed end of the can;

a second member contained within the can;

one of the first member and the second member having a cam portion, the cam portion including at least a peak and two valleys separated by the peak and slopes connecting the peak and the valleys, the cam portion having a cam surface formed on one side of the cam portion so that the intersection of the cam surface and a plane including a rotating axis of the hinge is maintained to be substantially same along the cam surface;

the other of the first member and the second member having a cam follower interacting with said cam portion;

an elastic member contained within the can and pushing the second member toward the first member; and a closer at least partially closing the opened end of the can.

BRIEF DESCRIPTION OF THE DRAWINGS

The above and other objects, advantages and features of the present invention will be apparent from the following description of preferred embodiments taken in conjunction with the accompanying drawings, wherein.

DETAILED DESCRIPTION OF THE PREFERRED EMBODIMENTS

Figure 1:
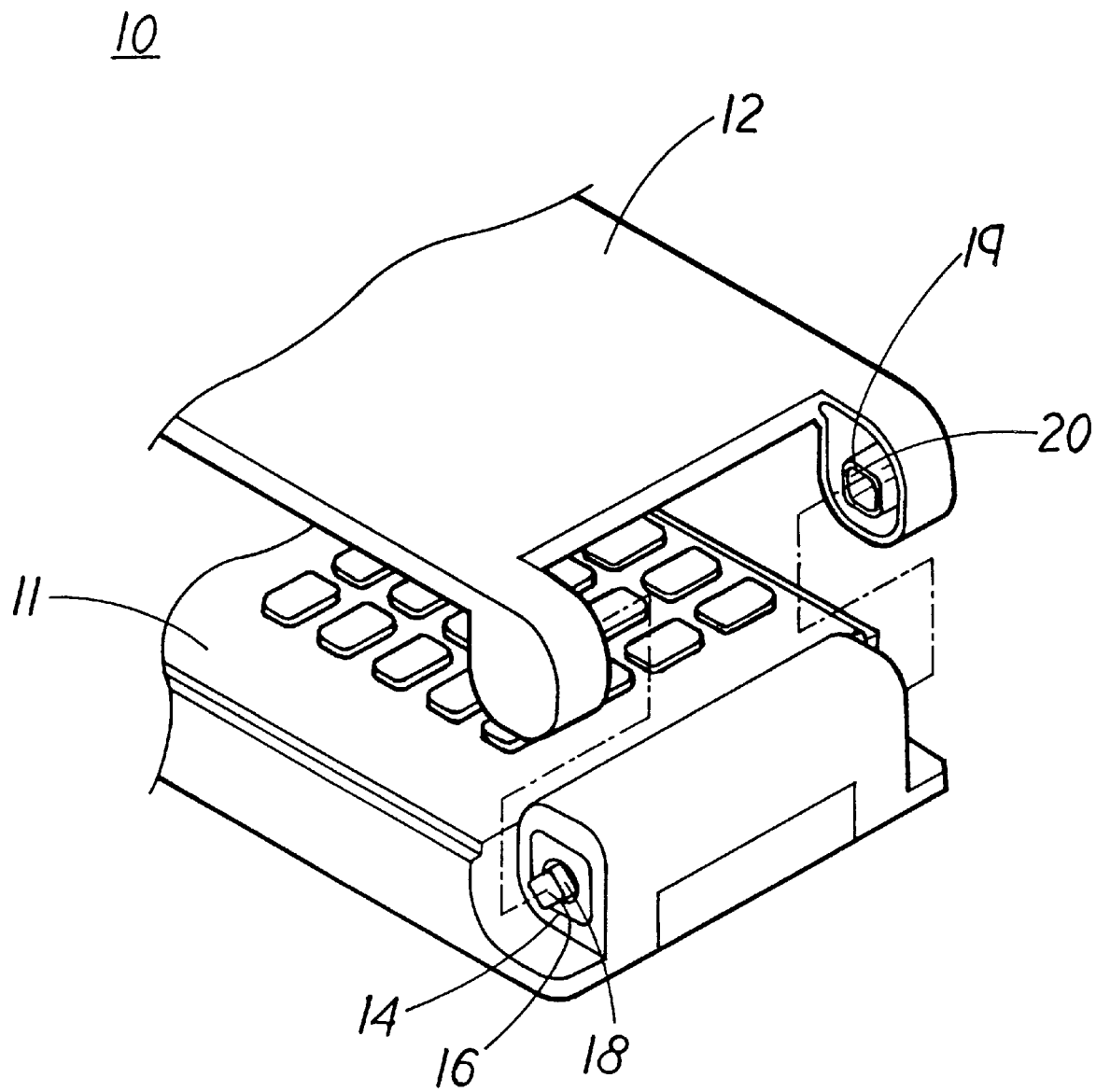
FIG. 1 is a partially cutaway exploded, perspective view of a portable radiotelephone showing that a hinge is assembled with a main body of the radiotelephone and a button cover is disassembled.

Referring to FIG. 1, a portable radiotelephone 10 has a button cover 12 mounted on an upper housing 11 thereof. The radiotelephone 10 has a hinge 14 to couple the upper housing 11 and the button cover 12. The hinge 14 has a rotatable shaft 16 extended outwardly. The shaft 16 has engaging surfaces 18. The button cover 12 has a bushing 19 engaging with the shaft 16. Alternatively, the button cover has a shaft, while the hinge has a bushing.

Figure 2:
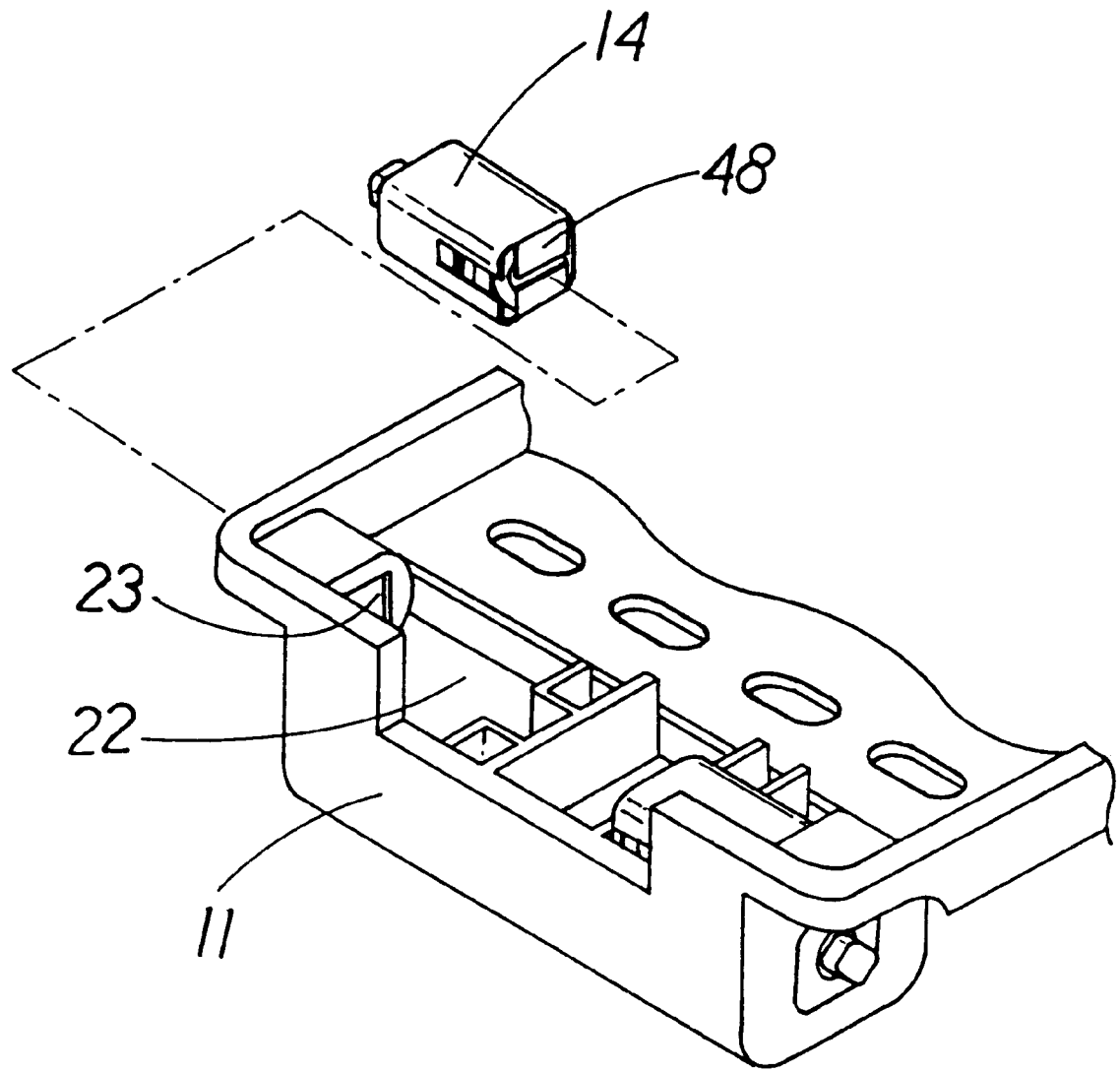
FIG. 2 is a partially cutaway exploded, perspective view of a upper housing of the portable radiotelephone and the hinge.

Referring to FIG. 2, the hinge 14 is mounted into a cavity 22 of the upper housing 11. A hole 23 for inserting the hinge 14 is prepared on a sidewall of the housing 11. The hinge 14 is inserted through the hole 23. Although FIG. 2 show that the hinge 14 is inserted through the hole 23, the hinge 14 may be inserted from the above of the housing 11 shown in FIG. 2.

Figure 3:
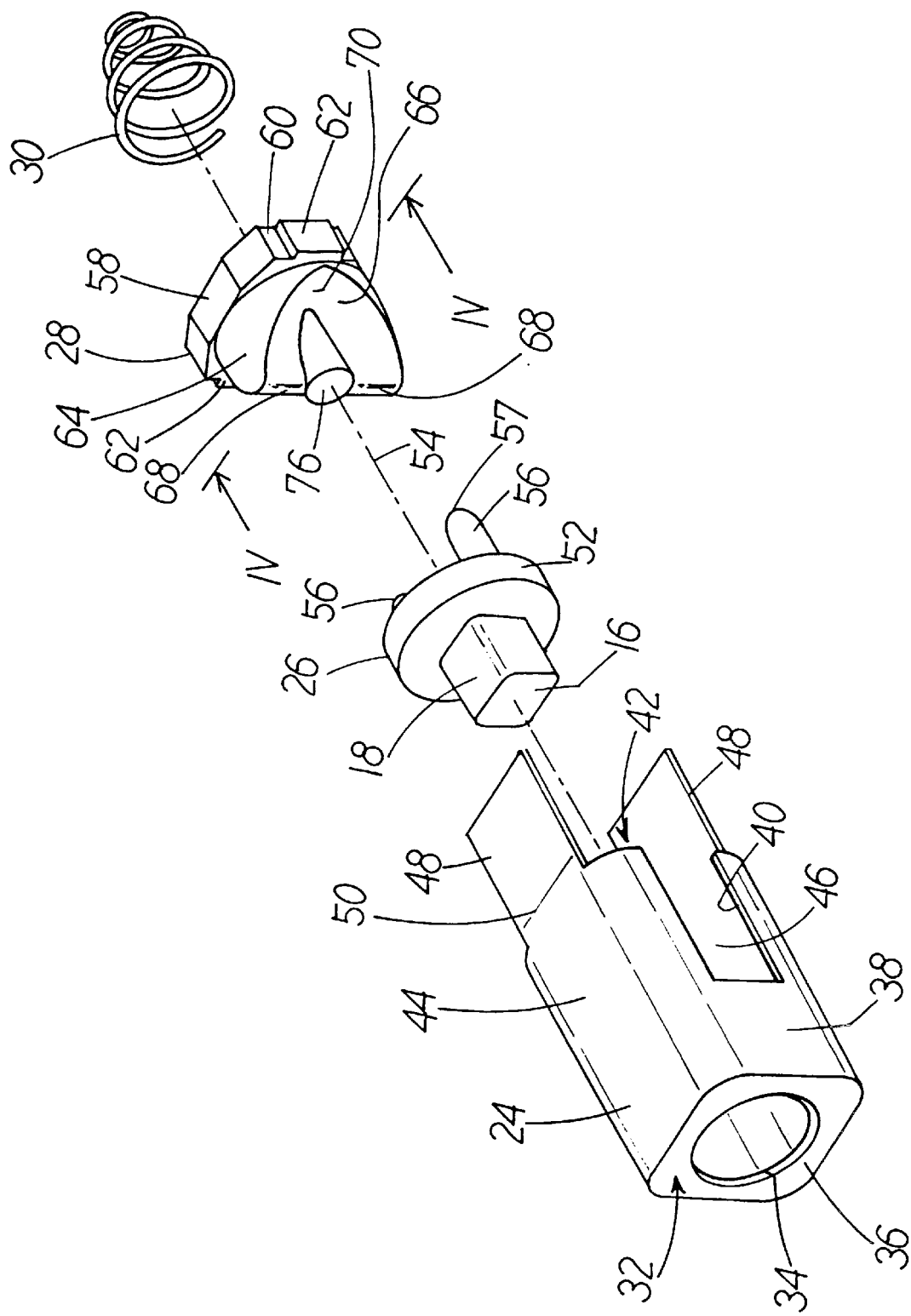
FIG. 3 is a exploded view of the hinge in accordance with the present invention.

Referring to FIG. 3, the hinge 14 in accordance with an embodiment of the present invention has a can 24, a first hinge member 26, a second hinge member 28 and an elastic member 30. The first member 26, second member 28 and elastic member 30 are in turn accommodated in the can 24.

The can 24 has an elongated octagonal shape. A longitudinal center line of the can 24 defines a rotating axis 54 of the hinge 14. One end 32 of the can 24 has a wall 36 and a hole 34 for the shaft 16 of the hinge 14 to extend therethrough. The other end 42 opposing to the end 32 is opened. Sidewall 38 of the can 24 has a groove 40 which is axially extended. Also, sidewall opposite to the sidewall 38 has a same kind of groove which is opened at the opened end 42.

Retaining Protrusions 48 extending from the end 42 are provided at sidewall 44 and 46. The protrusions 48 can be bent along bending lines 50 so as to at least partially cover the opened end 42. It is preferable that the can 24 is formed of metal such as brass and is manufactured by a method of drawing.

As shown in FIG. 3, the first member 26 has a disk-shaped body 52 and a shaft 16 which is projected from the body 52 along the axis 54. As described above, the shaft 16 has the engaging surfaces 18 for engaging with the button cover 12 (see FIG. 1).

On the other end of the first member opposite to the shaft 16, two protrusions 56 are projected from the body 52 and extended along the direction parallel to the axis 54. The protrusions 56 are diametrically positioned around the rotating axis 54 of the hinge 14.

The protrusions 56 function as a cam following portion or cam follower. The cam following portion or cam follower means a portion following a cam surface described below. Each protrusion 56 has a cylindrical body and a hemispherical end. Of course, the configuration of the protrusion 56 is not limited to the above. It can be understood in the art that the protrusion 56 may have a body of a polygonal pillar.

The first member 26 is inserted through the opened end 42 of the can 24. The first member 26 can rotate around the rotating axis 54 in the can 24. As described above, the shaft 16 of the first member 26 is extended through the hole 34 of the can 24. When the hinge 14 is mounted on the upper housing 11 of the radiotelephone 10, the shaft 16 of the first member 26 is projected outwardly (see FIG. 1 and FIG. 2).

Figure 4:
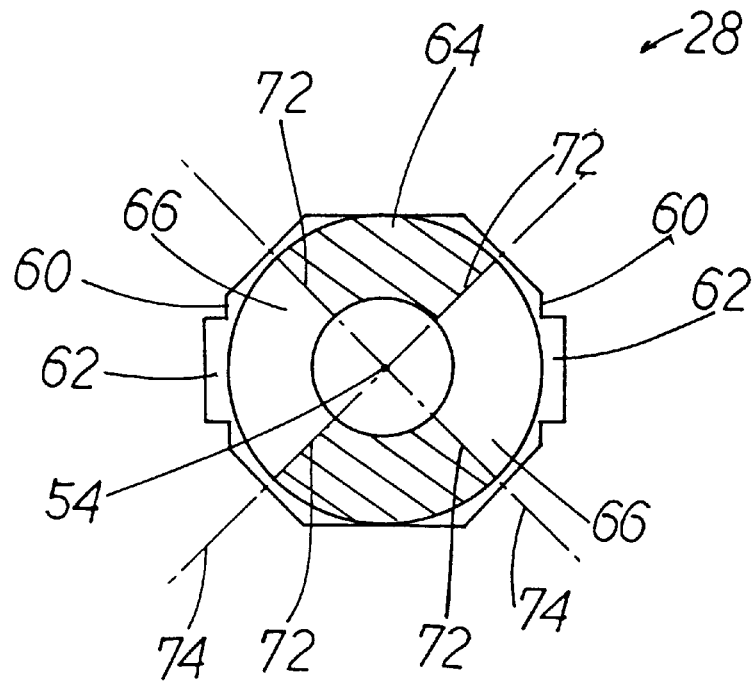
FIG. 4 is a sectional view taken along the line IV—IV of FIG. 3.

Referring to FIGS. 3 and 4, the second member 28 has a body 58 of an octagonal plate corresponding to the inside of housing 24. Opposing tabs 62 are projected from opposing sides of the body 58. A cylindrical cam portion 64 is formed on an end of the body 58. The cam portion 64 has a slanted cam surface 66 formed on an end of the cam portion 64. The cam portion 64 has two peaks 68 and two valleys 70. The peaks 68 are arranged diametrically and the valleys 70 are separated by the peaks 68 and arranged diametrically. The cam surface 66 is continuous to connect the peaks 68 and the valleys 70. As shown in FIG. 4, when the cam surface 66 of the second member 28 is intersected by a plane perpendicular to the axis 54, the intersection lines 72 and 74 are substantially straight and the extending line of each line 72 or 74 pass through the rotating axis 54.

Figure 5:
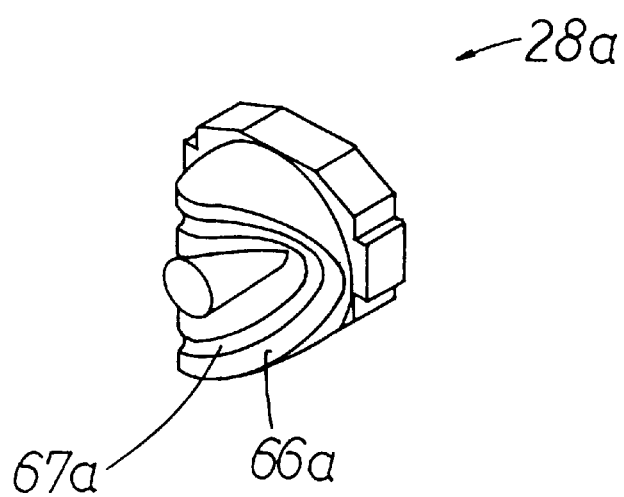
FIG. 5 is a perspective view of another second member of the hinge in accordance with the present invention.

FIG. 5 shows an alternative embodiment of the second member. A groove 67a is formed on and along a cam surface 66a of a second member 28a. In this case, when the hemispherical ends 57 of the protrusions 56 of the first member 26 make a contact and relative motion with the cam surface 66, the ends 57 are guided by the groove 67a.

When the cam portion of the second member 28a is taken by a plane including the axis 54, the intersection of the plane and the cam surface 66a includes two straight lines and a curved line between the straight lines. Alternatively, the cam portion may be configured so that the intersection has only a concave curve.

Referring to FIGS. 3, 4 and 5, it can be understood that the intersection of the cam surface and a plane including the rotating axis 54 is maintained to be substantially same along the cam surface.

Referring back to FIG. 3, the second member 28 has a cylindrical guide column 76 extended along the axis 54 so as to guide the relative motion between the first member 26 and the second member 28. It is preferable that the diameter of the column 76 is slightly less than a gap distance between the protrusions 56 of the first member 26.

The second member 28 is inserted through the opened end of the can 24. The cam surface 66 opposes to the protrusions 56 of the first member 26. The body 58 of the second member 28 is snugly inserted into the can 24. The tabs 62 are also inserted into the grooves 40 of the can 24. The configuration described above allows the second member 28 slide along the rotating axis 54 but prevents the second member 28 from rotating. However, it can be easily understood by one of ordinary skill in the art that an alternative configuration for guiding the linear motion and preventing the rotation of the second member 28 may be applied.

The elastic member 30 exerts the elastic force on the second member 28 to push the second member 28 toward the first member 26. It is preferable that the elastic member 30 is a conical coil spring so as to minimize its length when it is compressed.

Figure 6:
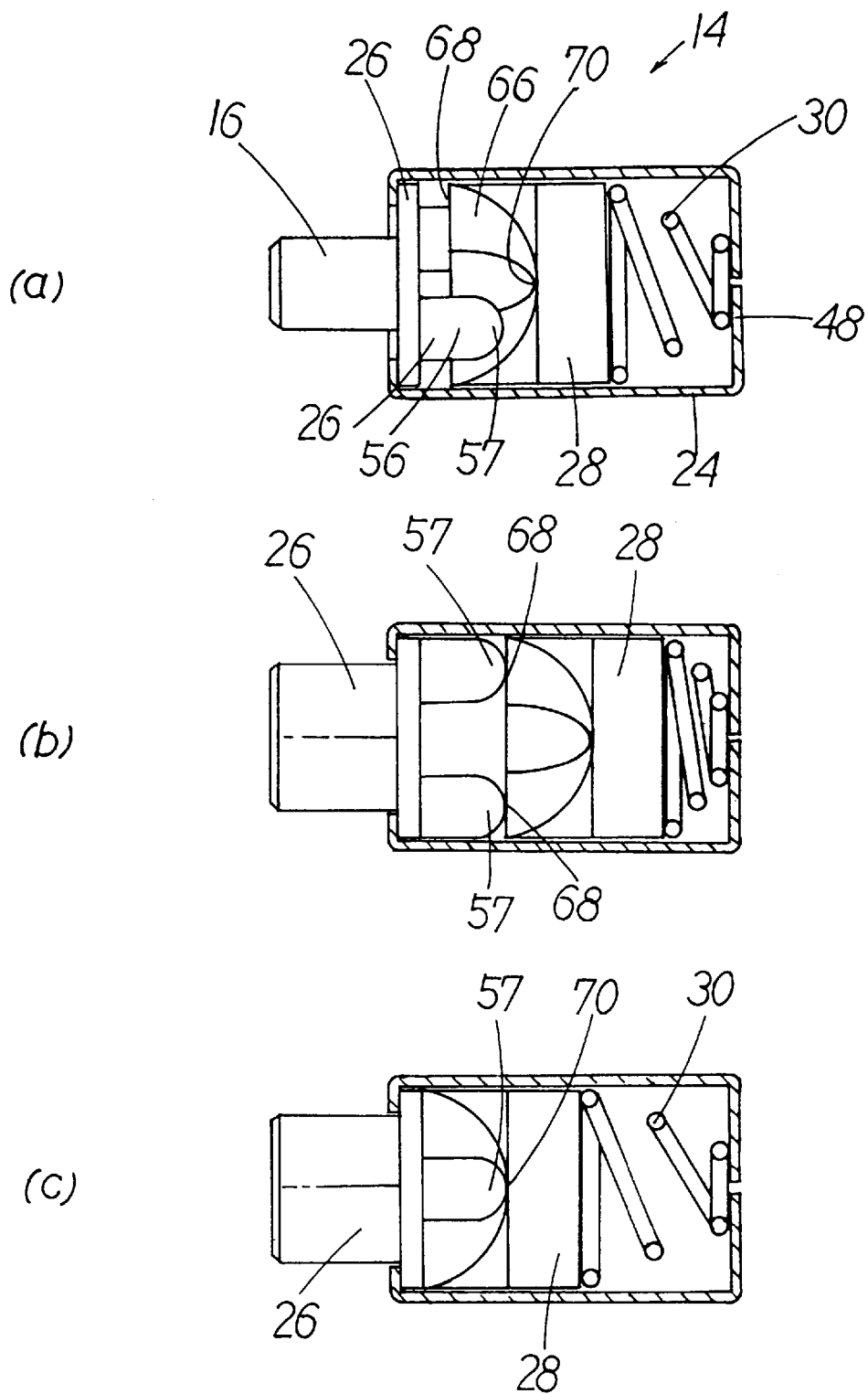
FIGS. 6A, 6B and 6C are sectional views of the hinge showing the operation of the hinge of FIG. 3.

After the first member 26, the second member 28 and the elastic member 30 are inserted into the can 24 in turn, the opened end 42 of the can 24 is at least partially covered by way of bending the protrusions 48 of the can 24 along the bending lines 50 (see FIGS. 2 and 6).

Referring to FIGS. 6a, 6b and 6c, the operation of the hinge 14 in accordance with the present invention will be explained below.

FIG. 6a shows a state of the hinge 14, for example, that the button cover 12 covers the buttons of the radiotelephone 10. The hemispherical ends 57 of the protrusions 56 are positioned on the slope surface between the peaks 68 and valleys 70 of the cam portion 64. The first member 26 tends to rotate by means of a interaction between the ends of the protrusions 56 and the slanted surface of the cam surface 66 of the second member 28 on which the elastic member 30 exert the force. This makes the button cover 12 offset toward the body of the radiotelephone 10 so as to keep the button cover 12 closed.

When a user rotate the button cover 12 in order to open the button cover 12, the hemispherical ends 57 of protrusions 56 slide along the slope surface toward the peaks 68. Then the spring 30 is compressed. FIG. 6b shows a state that the hemispherical ends 57 of the protrusions 56 reach the peaks 68. At this time, the button cover 12 is positioned a certain point between the first position and the second position, which will be referred to as a third position hereinbelow.

When the button cover 12 is opened further, the ends 57 of the protrusions 56 slide down along the slope of the cam surface 66. The first member 26 and the button cover can automatically rotate by means of the elastic force of the spring 30. The button cover 12 rotate until the ends 57 of the protrusions 57 arrive to the valleys 70. FIG. 6c shows a state that the button cover 12 arrives at the second position, in which the button cover 12 is opened.

It can be easily understood by those skilled in the art that, when the button cover 12 is closed, the hinge 14 operates similarly, but reversely.

If the button cover 12 is freed at a position between the first position and the third position, it rotates toward the first position. In the other hand, if the button cover 12 is freed at a position between the second and the third position, it rotates toward the second position.

Figure 7:
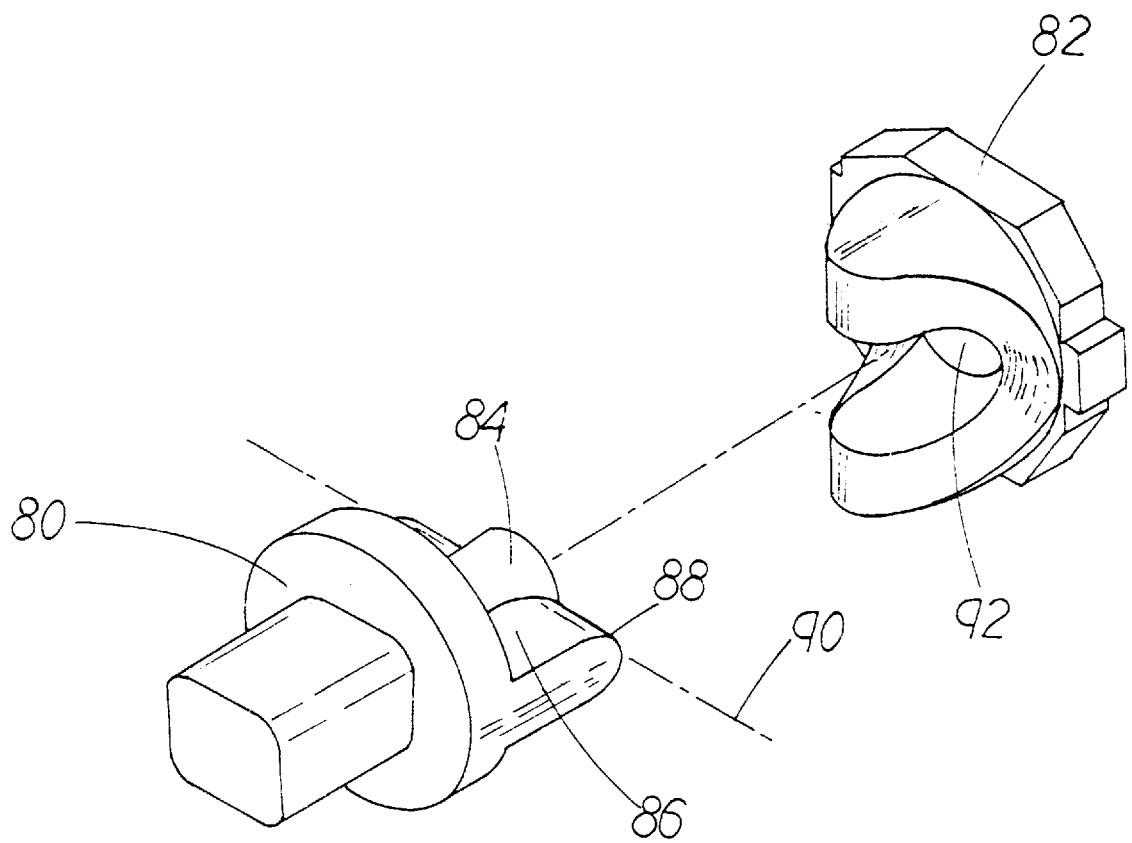
FIG. 7 is a exploded, perspective view of a first and second member of another hinge in accordance with the present invention.

FIG. 7 shows a first member 80 and a second member 82 of the hinge in accordance with a further alternative embodiment of the present invention. The body and the shaft of the first member 80 is similar to those of the first member 26 described in the above. The first member 80 has a cylindrical guide column 84 which is projected from the body and extended along the rotating axis. The first member 80 has opposing square protrusions 86 defining a cam follower. Each protrusion 86 extends axially and is diametrically positioned around the cylindrical guide column 84. Each protrusion 86 has an end 88. The shape of the intersection line of the end 88 and a plane parallel to the axis 54 is semicircular. This configuration offers line contact between the end 88 of the first member 80 and the cam surface of the second member 82. Although the protrusions 86 is shown to be integrated with the guide column 84 in FIG. 7, the protrusions 86 may be spaced from the guide column 84.

The body and the cam portion of the second member 82 are similar to those of the second member 28 described in the above embodiment. The second member 82 has a guide groove or hole 92. The guide column 84 is slidably inserted into the guide hole 92. The guide column 84 and the guide hole 92 guide the relative motion between the cam surface and the cam follower.

Figure 8:
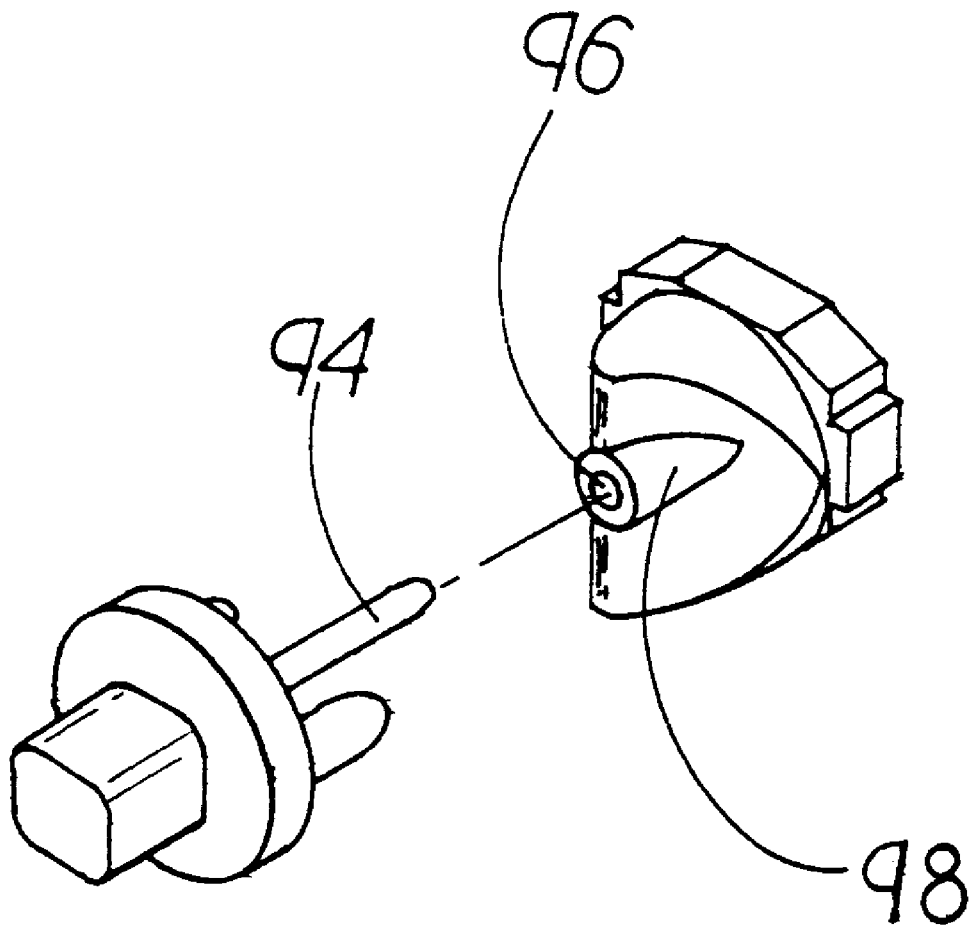
FIG. 8 is a exploded, perspective view of a first and second member of an alternative hinge in accordance with the present invention.

Referring to FIG. 8, in a further alternative embodiment of the present invention, the first member of the present invention has an elongated, cylindrical guide pin 94 and the second member has a guide column or boss 98 as in the second member shown in FIG. 3. A guide hole 96 is formed on the boss. The guide pin 94 and the guide hole 96 extend axially. The guide pin 94 is slidably inserted into the guide hole 96. The guide pin 94 and the guide hole 96 ensure the good guidance of the relative motion between the first and second members and prevent the second member from being slanted.

Although the present invention is described in detail referring to the above embodiments, the present invention is not limited to the above embodiments.

Although the can is described to have octagonal shape in the above embodiment, the can may have circular or rectangular shape. Then the body of the second member may have a shape corresponding to the can.

The slope angles of the potions of the cam surface which connect the peaks and the valleys are described to be same in the above embodiments. However, the angles of the surfaces connecting one of the peaks with two opposing valleys may vary. In this case, a line connecting the opposing peaks and a line connecting the opposing valleys are not perpendicular to each other.

Although it is explained that the first member have a cam follower and the second member has a cam portion in the above embodiment, the first member may have a cam surface and the second member may have a cam follower.

The can may be constructed of a thermoplastic resin and a cap may be provided to cover the opened end of the can.

The can may be configured to have a body of thermoplastic resin and a pair of retaining protrusions of metal by way of the insert molding.

Although the invention has been shown and described with respect to the exemplary embodiments, it should be understood that various changes, modifications and additions may be made without departing from the spirit and scope of the invention.

What is claimed is:

1. A hinge comprising:
    a single piece can having a hollow can wall, a first end, and a second end opposing the first end, the second end being at least partially closed with at least one extension of the can wall extending from the second end perpendicularly to the hollow can wall;
    a first member contained within the can and having a coupler end exposed to the outside of the can from the first end;
    a second member contained within the can, the second member opposing the first member;
    one of the first member and the second member having a cam, the other of the first member and second member having a cam follower interacting with the cam so that the first member rotates about an axis and the second member moves linearly along the axis when the cam follower follows the cam; and
    a resilient member contained within the can, urging the second member toward the first member.

2. The hinge of claim 1, wherein the cam follower has two protrusions diametrically positioned and extending toward the cam, and the cam has two diametrically positioned peaks and two diametrically positioned valleys.

3. The hinge of claim 2, wherein each protrusion has a hemispherical end.

4. The hinge of claim 1, wherein one of the first and second members has a guide column extending along the axis and the other of the first and second members has a guide hole provided along the axis, wherein the guide hole is configured to receive the guide column, whereby the first member can rotate about and the second member moves along the axis.

5. The hinge of claim 1, wherein the at least one extension comprises two opposingly positioned extensions, wherein the two extensions are bent toward each other.

6. The hinge of claim 1, wherein the at least one extension is bent to at least partially close the second end.

7. An apparatus, comprising:
    a first member rotatable about an axis;
    a second member located next to the first member, the second member linearly movable along the axis;
    a resilient member locating next to the second member and exerting force on the second member to make the first member and the second member contact each other;
    a housing enclosing the first member, the second member, and the resilient member along the axis; and
    a bendable wall attached to the housing, the bendable wall at least partially closing the housing, the bendable wall being configured to be bent relative to the housing, whereby enabling opening or closure of the housing;
    wherein the first member and the second member are configured such that:
        rotation of the first member up to an angle in a rotational direction about the axis causes movement of the second member in a first linear direction along the axis;
        rotation of the first member beyond the angle in the same angular direction about the axis causes movement of the second member in a second linear direction opposite the first linear direction by the force of the resilient member; and
        this movement of the second member in the second linear direction causes further rotation of the first member in the same angular direction about the axis.

8. The apparatus as defined in claim 7, further comprising an opening provided on the housing, wherein a shaft is configured to pass through the opening, and the shaft is either attached to the first member or attached to an external member which couples to the first member.

9. The apparatus as defined in claim 8, wherein the first member is located closer to the opening than the second member.

10. The apparatus as defined in claim 8, wherein the second member comprises a guide hole along the axis.

11. The apparatus as defined in claim 8, wherein the apparatus comprises an electronic device comprising a cover and a body, the body receiving the housing, wherein the shaft couples to the cover and pivotally connects the cover to the body.

12. The apparatus as defined in claim 11, wherein the body of the electronic device further comprises a cavity to receive the housing.

13. The apparatus as defined in claim 8, wherein the apparatus comprises a modular hinge device.

14. The apparatus as defined in claim 7, wherein the second member comprises a slanted surface as a cam opposing the first member, the first member comprises a cam follower opposing the cam surface of the second member, wherein as the first member rotates about the axis, the cam follower moves around the axis while contacting the slanted cam surface, whereby the second member moves linearly back and forth along the axis.

15. The apparatus as defined in claim 14, wherein the first member further comprises a guide column at the axis extending toward the second member, the second member further comprises a guide hole receiving the guide column.

16. The apparatus as defined in claim 14, wherein the cam follower comprises at least one protrusion extending parallel to the axis toward the cam of the second member.

17. The apparatus as defined in claim 16, wherein the protrusion has a rounded distal end.

18. The apparatus as defined in claim 16, wherein the cam follower comprises two protrusions, the two protrusions being diagonally positioned about the axis.

19. The apparatus as defined in claim 18, wherein the slanted cam surface comprises a guide groove around the axis to guide movement of the protrusions.

20. The apparatus as defined in claim 16, wherein the cam follower comprises a square protrusion formed on a plane including the axis.

21. The apparatus as defined in claim 14, wherein the slanted surface of the second member is configured such that the second member makes two strokes along the axis as the first member rotates 360° about the axis.

22. The apparatus as defined in claim 21, wherein the slanted surface comprises two peaks and two valleys, wherein the two peaks are diagonally positioned with respect to each other about the axis, and the two valleys are diagonally positioned each other about the axis.

23. The apparatus as defined in claim 7, wherein the resilient member comprises a spring.

24. The apparatus as defined in claim 23, wherein the spring comprises a conical spring.

25. The apparatus as defined in claim 7, wherein the first member comprises a slanted surface as a cam opposing the second member, the second member comprises a cam follower opposing the cam surface of the first member, wherein as the first member rotates about the axis, the cam follower moves along the axis while contacting the slanted cam surface, whereby the second member moves linearly back and forth along the axis.

* * * * *